(12) United States Patent
Donkin

(10) Patent No.: US 10,814,705 B2
(45) Date of Patent: Oct. 27, 2020

(54) DEPLOYABLE CANOPIES FOR VEHICLES

(71) Applicant: Mark Donkin, Pacific Pines (AU)

(72) Inventor: Mark Donkin, Pacific Pines (AU)

(*) Notice: Subject to any disclaimer, the term of this patent is extended or adjusted under 35 U.S.C. 154(b) by 0 days.

(21) Appl. No.: 16/612,663

(22) PCT Filed: May 15, 2018

(86) PCT No.: PCT/AU2018/050456
§ 371 (c)(1),
(2) Date: Nov. 11, 2019

(87) PCT Pub. No.: WO2018/209384
PCT Pub. Date: Nov. 22, 2018

(65) Prior Publication Data
US 2020/0207194 A1 Jul. 2, 2020

(30) Foreign Application Priority Data

May 15, 2017 (AU) ................................ 2017901804
May 15, 2017 (AU) ................................ 2017901805

(51) Int. Cl.
*B60J 7/04* (2006.01)
*B60J 1/08* (2006.01)
(Continued)

(52) U.S. Cl.
CPC .............. *B60J 7/041* (2013.01); *B60J 1/085* (2013.01); *B60J 1/14* (2013.01); *B60J 1/17* (2013.01); *B60J 7/068* (2013.01); *B60P 7/02* (2013.01)

(58) Field of Classification Search
CPC .. B60J 7/041; B60J 1/085; B60J 7/068; B60P 7/02
See application file for complete search history.

(56) References Cited

U.S. PATENT DOCUMENTS 4,712,827 A * 12/1987 Jensen ....................... B60J 7/20
296/10
4,799,726 A * 1/1989 Scott ........................ B60J 7/106
296/10
(Continued)

FOREIGN PATENT DOCUMENTS

CN 1315280 A 10/2001
CN 106585477 A 4/2017
(Continued)

OTHER PUBLICATIONS

International Search Report dated Jul. 4, 2018 from corresponding PCT Application No. PCT/AU2018/050456.

*Primary Examiner* — Jason S Morrow
(74) *Attorney, Agent, or Firm* — Innovation Capital Law Group, LLP; Vic Lin

(57) ABSTRACT

There is provided herein improvements in deployable canopies for utility vehicles having a cabin and a cargo bay. According to one aspect, the system comprises a deployable canopy which has a roof portion and rearward columns extending downwardly therefrom. The roof portion slides along cabin roof tracks and the columns slide along cargo bay edge tracks longitudinally from stowed to deployed positions for selectively enclosing the canopy bay. The deployable canopy may stow side panels horizontally therein, which when the canopy is deployed, the side panels slide therefrom transitioning from horizontally to vertically, typically under automatic mechanical actuator control, using an arrangement of tracks. According to another aspect, the system has a removable cassette that selectively engages longitudinally between forward and rearward builder bars and have longitudinal lateral openings from which side covers unfurl slide within builder bars tracks.

17 Claims, 13 Drawing Sheets

(51) Int. Cl.
 B60J 1/14 (2006.01)
 B60J 1/17 (2006.01)
 B60J 7/06 (2006.01)
 B60P 7/02 (2006.01)

(56) References Cited

U.S. PATENT DOCUMENTS

| | | | |
|---|---|---|---|
| 5,186,231 A | | 2/1993 | Lewis |
| 5,259,659 A | | 11/1993 | Inaba |
| 10,005,347 B1 * | | 6/2018 | Singer ................. B60J 7/041 |
| 2002/0008396 A1 | | 1/2002 | Gaillard |
| 2017/0349037 A1 * | | 12/2017 | Singer ................. B60J 7/041 |
| 2019/0359042 A1 * | | 11/2019 | Singer ................. B60J 7/08 |
| 2020/0207194 A1 * | | 7/2020 | Donkin ............... B60J 1/085 |

FOREIGN PATENT DOCUMENTS

| | | |
|---|---|---|
| DE | 10028777 A1 | 1/2002 |
| DE | 10340085 A1 | 11/2004 |
| EP | 1291218 A1 | 3/2003 |
| FR | 2845964 A1 | 4/2004 |
| WO | 2007140697 A1 | 12/2007 |
| WO | 2017013328 A1 | 1/2017 |

\* cited by examiner

DEPLOYABLE CANOPIES FOR VEHICLES

FIELD OF THE INVENTION

This invention relates generally to improvements in deployable canopies for vehicles.

BACKGROUND OF THE INVENTION

WO 2007/140697 A1 (ZHANG HAO) 13 Dec. 2007 & CN2918151Y [hereinafter referred to as D1] discloses a longitudinally sliding cargo canopy which slides along tracks atop a vehicle cabin and along side edges of a cargo area to selectively enclose a cargo area.

CN 1315280 A (SONG WEI) 3 Oct. 2001 [hereinafter referred to as D2] similarly discloses a longitudinally sliding cargo canopy but which comprises a screw drive concealed beneath cowling for propelling the canopy. When the canopy is deployed, windows concealed within side walls of the cargo bay deploy upwardly to enclose the cargo area.

DE 10340085 A1 (DAIMLER CHRYSLER AG) 18 Nov. 2004 [hereinafter referred to as D3] similarly discloses a longitudinally sliding cargo canopy but which comprises windows hingedly coupled at lateral edges of the canopy to swing down for deployment in a first embodiment and windows concealed within side walls of the canopy bay for upward deployment in a second embodiment.

US 2002/0008396 A1 (DE GAILLARD) 24 Jan. 2002 [hereinafter referred to as D4] similarly discloses a longitudinally sliding cargo canopy comprising removable windows in embodiments which may be stowed in various compartments when not required.

DE 10028777 A1 (WEBASTO VEHICLE SYSTEMS INTERNATIONAL GMBH) 3 Jan. 2002 [hereinafter referred to as D5] similarly discloses a longitudinal sliding cargo canopy similarly comprising windows concealed within side walls of the cargo bay.

FR 2845964 B1 (RENAULT S.A.S) 23 Apr. 2004 [hereinafter referred to as D6] similarly discloses a longitudinally sliding cargo canopy in a first embodiment and a cargo canopy deployable by stowable struts, windows and the columns in a second embodiment.

U.S. Pat. No. 5,259,659 A (INABA) 9 Nov. 1993 [hereinafter referred to as D7] discloses a utility vehicle comprising side covers that unroll into lateral edge tracks to selectively enclose an area of a cargo bay.

CN 106585477 A (ZHENJIANG COLLEGE) 26 Apr. 2017 [hereinafter referred to as D8] similarly discloses a utility vehicle comprising side covers that unroll into lateral edge tracks to selectively enclose an area of a cargo bay.

U.S. Pat. No. 5,186,231 A (LEWIS) 16 Feb. 1993 [hereinafter referred to as D9] discloses an awning held by longitudinal struts which unrolls across the top of a cargo bay.

WO 2017/013328 A1 (RENAULT S.A.S) 26 Jan. 2017 [hereinafter referred to as D10] discloses a longitudinally unrolling cover for covering the roof and rear of a vehicle.

EP 1291218 A1 (ADAM OPEL AG) 12 Mar. 2003 [hereinafter referred to as D11] similarly discloses a longitudinally unrolling cover for covering the roof and rear of the vehicle.

The present invention seeks to provide improvements in deployable canopies for vehicles, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein improvements in deployable canopies for utility vehicles having a cabin and a cargo bay.

In accordance with a first embodiment, the system comprises a deployable canopy comprising a roof portion and rearward columns extending downwardly therefrom. The roof portion slides along cabin roof tracks and the columns slide along cargo bay edge tracks longitudinally from stowed to deployed positions for selectively enclosing the canopy bay.

The deployable canopy is characterised in stowing side panels horizontally therein or thereunderneath in the stowed position. When the canopy is deployed, the side panels slide therefrom transitioning from horizontally to vertically, typically under automatic mechanical actuator control, using an arrangement of tracks.

Specifically, the arrangement of tracks comprises horizontal tracks formed by the roof portion between which inner edges of the panels slide horizontally. The arrangement of tracks further comprises vertical tracks between which outer edges of the panels slide vertically.

The vertical tracks are formed by rearward vertical tracks on front edges of the rearward columns and forward vertical tracks formed by the cabin or fixed vertical columns.

When the canopy is deployed, forward tracks of the horizontal tracks and the forward vertical tracks come into alignment such that the outer forward edge bearings of the panels are able to transition therebetween to transition from vertically to horizontally.

The deployment of the panels in this way allows for the deployment of the side panels by controlling both inner and outer edges thereof in contradistinction to the hingedly coupled pivoting-type deployment of the side panels of the prior art. Specifically, prior art arrangements may comprise a first arrangement wherein the side panels firstly jut horizontally from the canopy and then pivot downwardly and a second arrangement wherein the panels pivot outwardly within the interior of the canopy.

However, the first arrangement is prone to obstruction and may be buffeted by wind shear when travelling. Furthermore, the second arrangement may be obstructed by cargo within the cargo bay.

In contradistinction, the present arrangement controls both inner and outer edges of the panels thereby avoiding protruding beyond the canopy or transitioning through a substantial interior of the cargo bay.

Furthermore, the present arrangement allows the panels to seal tightly against lower and lateral weather seals by downward pressure on the bearings of the vertical tracks against the lower weather seals and upward pressure on the bearings of the horizontal tracks against the lateral weather seals.

Furthermore, the present arrangement allows the panels to support additional componentry, such as pivoting glass windows.

The panels may be deployed by way of electromechanical actuation, such as one comprising rotating screw drive rods. A pair of screw drive rods may drive forward and rearward edges of the inner edges of the panels. Furthermore, a single screwdriver rod may drive both panels oppositely.

The way in which the panels transition within the arrangement of tracks under such actuation applies maximum pressure to lower edges thereof when fully deployed, thereby maximising pressure on edge weather seals. Furthermore, the upward force applied by such actuation may further maximise pressure on lateral weather seals when fully deployed.

In accordance with a second embodiment, there is provided a removable cassette that selectively engages longitudinally between forward and rearward builder bars by way of corresponding forward and rearward couplings.

The removable cassette comprises longitudinal lateral openings from which side covers unfurl and engage and slide within inner facing tracks along the builder bars to selectively cover sides of the cargo bay.

In one embodiments, the removable cassette may comprise a substantially elongate construction, such as one comprising a generally ovular cross-section wherein the side covers are rolled therein into rolls and which may be pulled therefrom via the longitudinal lateral openings. This embodiment may be suitable for roller shutters or flexible covers, such as reinforced canvas side covers.

The rolls may be coiled spring retractable or alternatively electromechanically actuated.

In accordance with a further embodiment, the removable cassette may be substantially flat comprising one or a pair of coplanar overlapping straight channels defining the lateral open edges at opposite sides thereof from which the respective covers may deploy. This embodiment may be suitable for less flexible covers, such as metallic covers comprising an interlocking arrangement of metallic extrusions.

In accordance with one embodiment, the forward and rearward couplings may comprise selectively longitudinally extending locking pins which extended to corresponding apertures of the builder bars. In this way, the removable cassette may be easily removed or engaged between the builder bars by retracting the locking pins.

In embodiments, the inner facing tracks may be provided by way of sleeves which locate around the builder bars.

In accordance with one aspect, there is provided a deployable canopy system for a utility vehicle having a cabin and a cargo bay, the system comprising a deployable canopy, the canopy comprising a roof portion and rearward travelling columns wherein the front of the canopy engages roof mounted cabin tracks and wherein distal ends of the rearward columns engage cargo bay edge tracks of the cargo bay such that the deployable canopy is able to slide longitudinally from a stowed position wherein the roof portion lies substantially atop the cabin to a deployed configuration wherein the roof portion substantially covers the cargo bay, wherein the roof portion stows side panels horizontally in the stowed position for deployment for covering sides of the cargo bay in the deployed configuration and wherein each side panel defines an inner edge and an outer edge, wherein the inner edge slides horizontally within opposing horizontal roof portion tracks and wherein the outer edge slides vertically within opposing inner facing vertical tracks between the rearward columns and the cabin and wherein the inner facing vertical tracks comprise forward and rearward vertical tracks and the horizontal roof portion tracks comprise forward and rearward horizontal tracks and wherein, in the deployed position, the forward horizontal and vertical tracks align.

The system may further comprise fixed forward columns having the forward vertical tracks.

The rearward columns may comprise substantially orthogonal rearward and lateral portions and wherein, in the stowed configuration, the lateral portions overlap or adjoin the forward columns.

The panels may comprise bearings which run within the tracks.

The bearings may be keyed within a widened channel within the tracks.

The cargo bay edge tracks may have oppositely inner facing entrances.

The deployable canopy system may further comprise panel locking pins selectively locking within corresponding apertures.

The panels may comprise selectively longitudinally extending locking pins selectively locking into corresponding apertures at at least one side panel position, the apertures located in alignment with the tracks.

The locking pins may be coaxial with bearings of the panels.

The deployable canopy system may further comprise edge seals which seal against outer edges of the panels and the cargo bay.

The deployable canopy system may further comprise lateral seals which seal against side outer facing edges of the panels and corresponding inner facing edges of the columns.

The panels may transition by way of electromechanical actuator.

The panels may transition by way of screw drive electromechanical actuator having at least one laterally orientated screw rod.

The screw drive electromechanical actuator acts on the inner edges of the panels.

The panels may comprise hingedly coupled or sliding windows.

The deployable canopy system may further comprise gas struts holding the windows open.

The deployable canopy system may further comprise an upwardly deployable tailgate window enclosing a rear of the deployable canopy in the deployed position.

According to another aspect, there is provided a deployable canopy system for a utility vehicle having a cabin and a cargo bay, the system comprising a removable cassette selectively engaging longitudinally between forward and rearward builder bars of the cargo bay, wherein the removable cassette comprises lateral edges from which side covers retained therein feed horizontally into inner facing forward and rearward tracks for selectively covering the cargo bay, wherein the removable cassette comprises forward and rearward couplings for selectively engaging between the forward and rearward builder bars and wherein, when the removable cassette is engaged between the builder bars, edges of the side covers extend into the respective tracks.

The couplings may comprise selectively longitudinally extending locking pins which selectively locked within corresponding apertures of the builder bars.

The couplings further comprise a lower portion of the tracks extending underneath the removable cassette to hold up the removable cassette.

The removable cassette may comprise a width less than that of half the cargo bay.

The removable cassette may comprise a substantially ovular cross-section having rolls of the covers rolled therein and having the lateral edges at opposite lateral sides thereof.

The rolls may be coiled spring retracted.

The rolls may be motorised.

The removable cassette may comprise a width greater than that of half the cargo bay.

The removable cassette may comprise a substantially flat construction.

The removable cassette may comprise one or a pair of coplanar overlapping straight channels each leading to the lateral edges at opposite lateral sides thereof.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
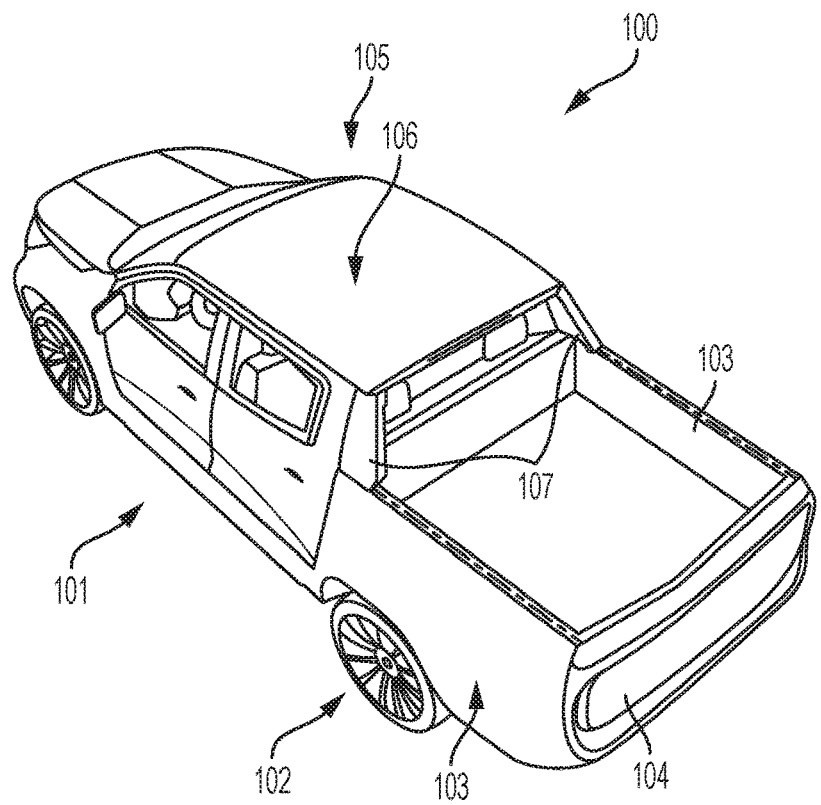
FIGS. 1-3 illustrate the deployment of a deployable canopy for a utility vehicle in accordance with an embodiment.

FIG. 1 illustrates a utility vehicle 100 comprising a cabin 101 and a cargo bay 102. The cargo bay 102 comprises lateral side walls 103 and a tailgate 104. The vehicle 100 comprises a longitudinally sliding deployable canopy 105 which slides rearwardly for deployment as is substantially shown in FIGS. 2-3.

Figure 2:
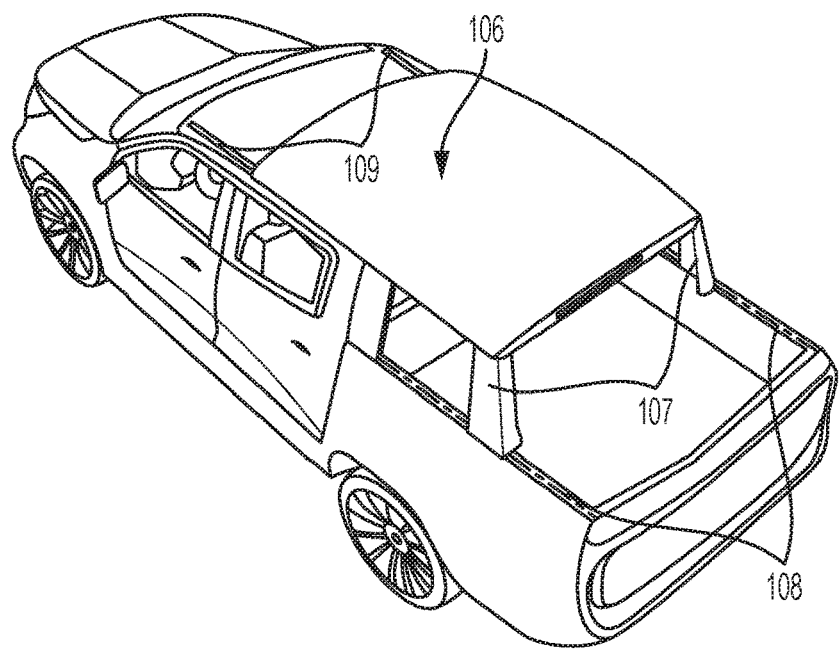

The deployable canopy 105 comprises a roof portion 106 and a pair of rear travelling support columns 107. As is best shown in FIG. 2, the rearward support columns 107 slide along cargo bay upper edge tracks 108 whereas a front portion of the roof portion 106 engages and slides long roof tacks 109.

Figure 3:
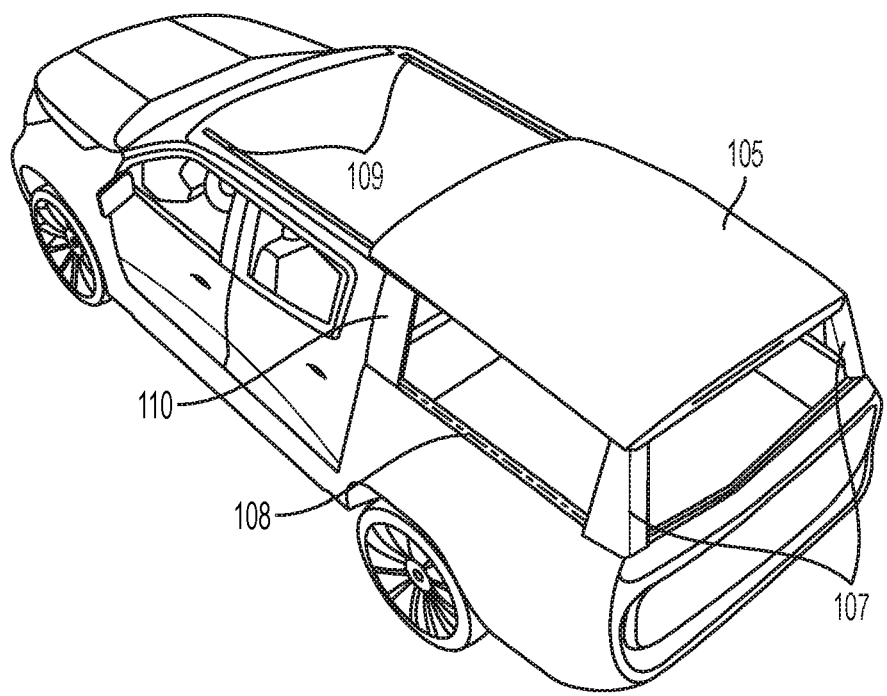

The deployable canopy 105 slides to the rearward extent as is illustrated in FIG. 3 along the tracks 108, 109.

The deployable canopy 105 may comprise forward columns 110 which remains static. In accordance with this embodiment, the rearward columns 107 may angle through approximately 90° each comprising a rearward portion and a lateral portion and wherein, when in the forward position, the lateral portions overlap or adjoin the forward columns 110.

In one embodiment, the forward columns 110 may locate inward from the edge tracks 108 whereas the lateral portions of the rear travelling support columns 107 may locate outward from the edge tracks 108. In this manner, the lateral portions may overlap the forward columns 110 as a substantially shown in FIG. 1.

However, in embodiments, the lateral portions of the rear travelling support columns 107 and the forward columns 110 are in alignment along the edge tracks 108 such that the rear travelling support columns 107 adjoin against the forward columns 110 along the edge tracks 108. The alignment of the lateral portions of the rear travelling support columns 107 and the forward columns 110 allows forward and rearward edges of the panels 111 to align.

In the fully deployed position, the 90° rearward and lateral portions may align substantially with the outer sides of the sidewalls 103 and tailgate 104 of the cargo bay 102.

In embodiments, the deployable canopy 106 may move along a screw drive actuator mechanism.

Figure 4:
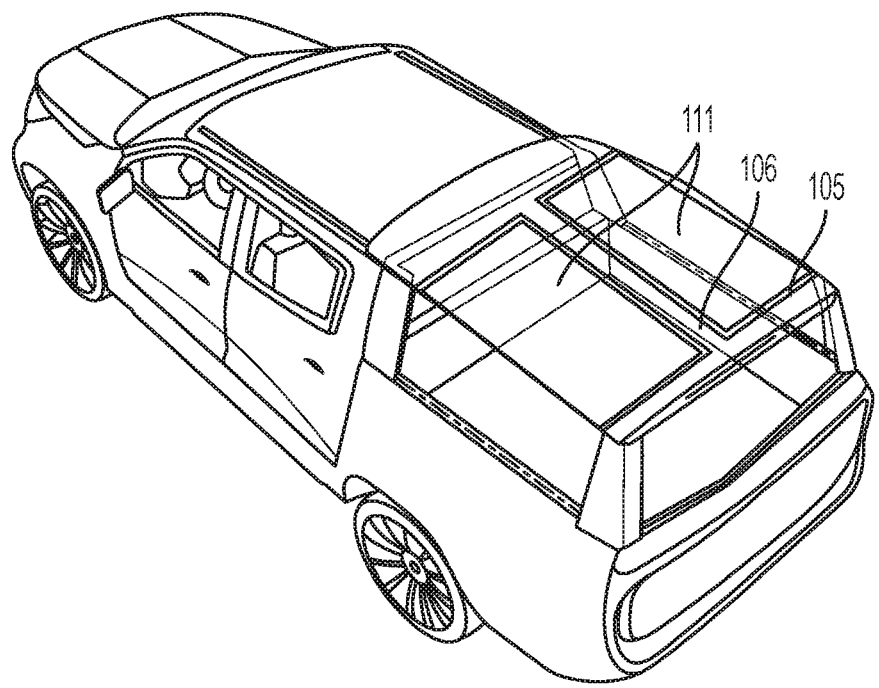
FIGS. 4-6 illustrate the deployment of side panels from being stowed horizontally within a roof portion of the deployable canopy to being vertically held between rear travelling columns and the cabin of the utility vehicle.

As is shown in FIG. 4, the deployable canopy 105 may comprise a pair of deployable side panels 111 stowed horizontally underneath or within the roof portion 106. FIG. 4 illustrates the panels 111 in a stowed position.

Figure 5:
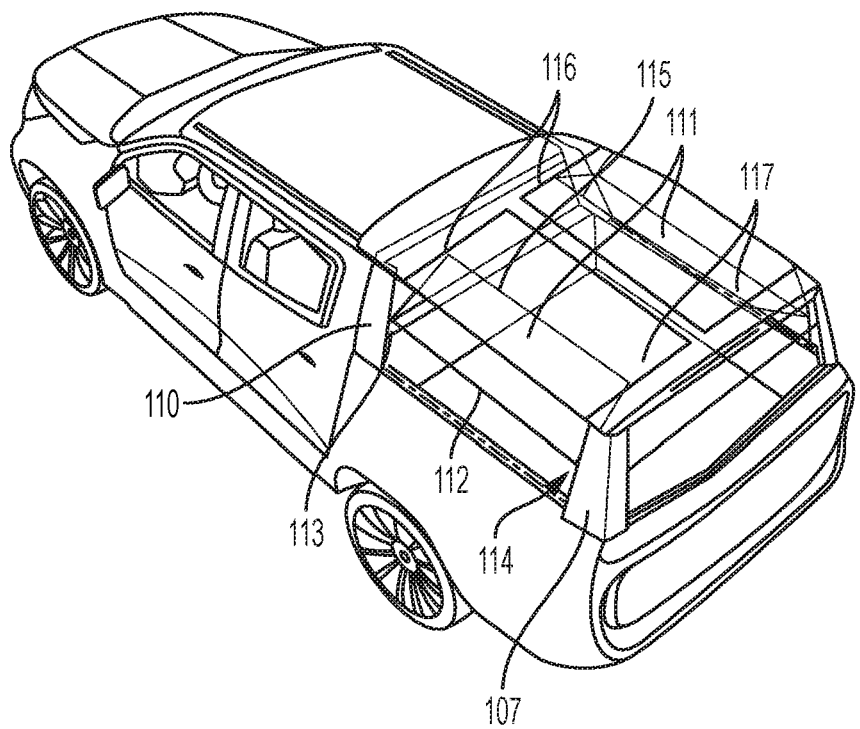
Figure 6:
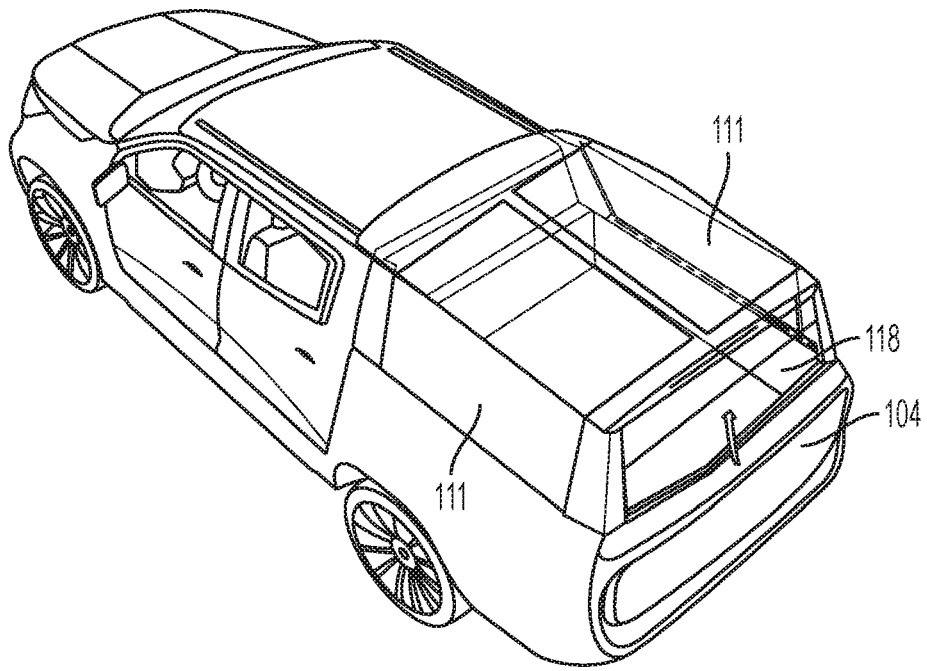

FIGS. 5 and 6 illustrate the deployment of the deployable side panels 111 to enclose the sides of the cargo area. Specifically, as is illustrated in FIG. 5, opposite sides of an outer edge 112 of each side panel 111 travels between a forward vertical track 113 of the forward column 110 or cabin 101 and a rearward vertical track 114 of the rearward column 107. Furthermore, opposite sides of an inner edge 115 of each panel slide between a forward horizontal roof portion track 116 and a rearward horizontal roof portion track 117.

FIG. 6 illustrates the side panels 111 being fully deployed, thereby enclosing the sides of the cargo area.

The panels may be deployed by way of election mechanical actuator, such as a geared screw drive election mechanical actuator which may comprise a pair forward and rearwardly laterally orientated screw rods acting on the inner edges 115 of the panels 111. In embodiments, a single screw drive may act on both inner edges 115 of both side panels 111.

When the screw drive displaces the inner edges 115 outwardly, the outer edges 112 are similarly depressed downwardly. As can be appreciated, given the pivoting motion of the panels 111, downward force on the outer edges 112 is maximised at the end stage of deployment, thereby assisting in pressing the outer edges 112 against lateral whether seals described in further detail below. Furthermore, the outward pressure applied by the screw drive may similarly provide adequate outward pressure to adequately press against lateral whether seals between outer lateral sides of the panels 112 and inner surfaces of the columns 110, 107.

In embodiments, a tailgate window 118 may slide upwardly from within the tailgate 104. In alternative embodiments, the tailgate window 112 may be hinged to a rear edge of the roof portion 106 so as to pivot downwardly to meet the upper edge of the tailgate 104.

Figure 7:
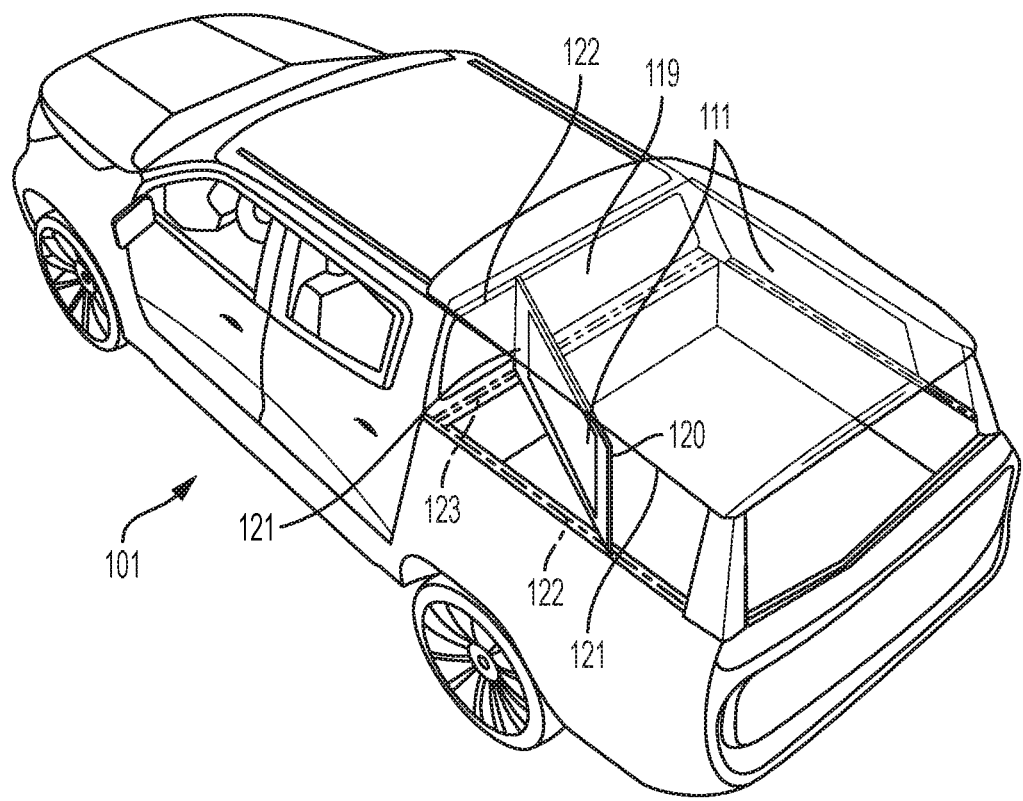
FIG. 7 illustrates an embodiment wherein the side panels are stowed overlapping against the rear cabin or chauffeur window of the cabin accordance with an embodiment

FIG. 7 illustrates an embodiment wherein the side panels 111 are stowed against the cabin rear window or chauffeur window 119 of the cabin 101. Specifically, in accordance with this embodiment, opposite sides of a rearward edge 120 of the side panel 111 engage and slide within an upper longitudinal roof canopy track 121 and a lower longitudinal cargo bay edge track 122. Furthermore, opposite sides of a forward edge 121 engage and slide within an orthogonal upper roof canopy track 122 and a lower orthogonal cargo bay track 123. When stowed, the side panels 111 may overlap each other against the cabin rear window or chauffeur window 119. In this manner, deployment may comprise the automated electromechanical deployment of the panels 111 in turn.

Figure 8:
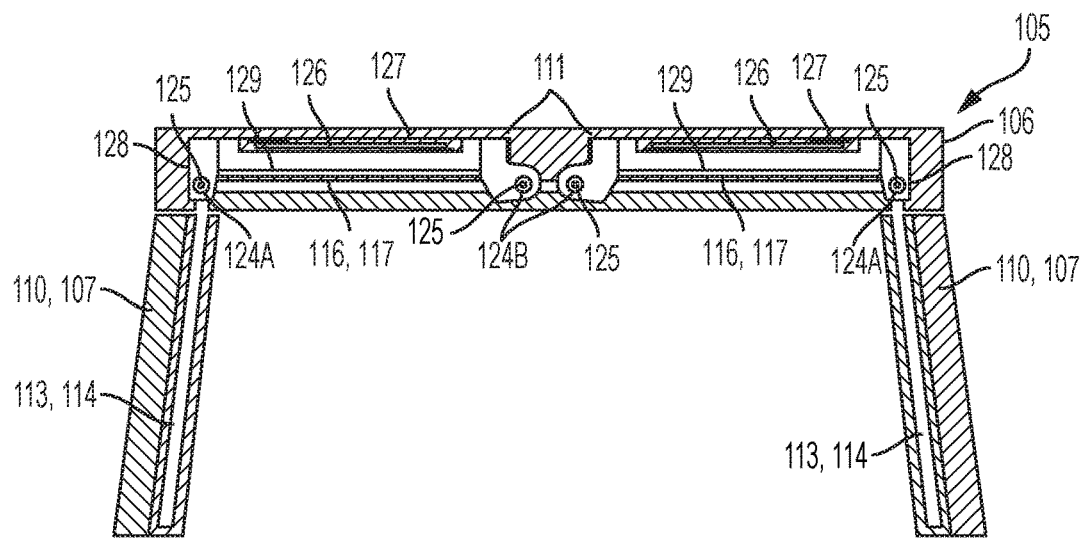
FIGS. 8-10 illustrate rear elevation views of the deployable canopy illustrating the deployment of the side panels.
Figure 9:
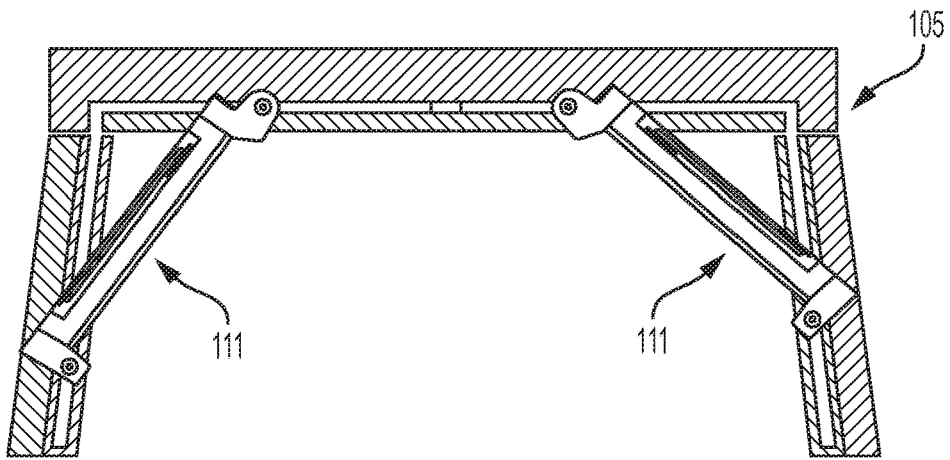
Figure 10:
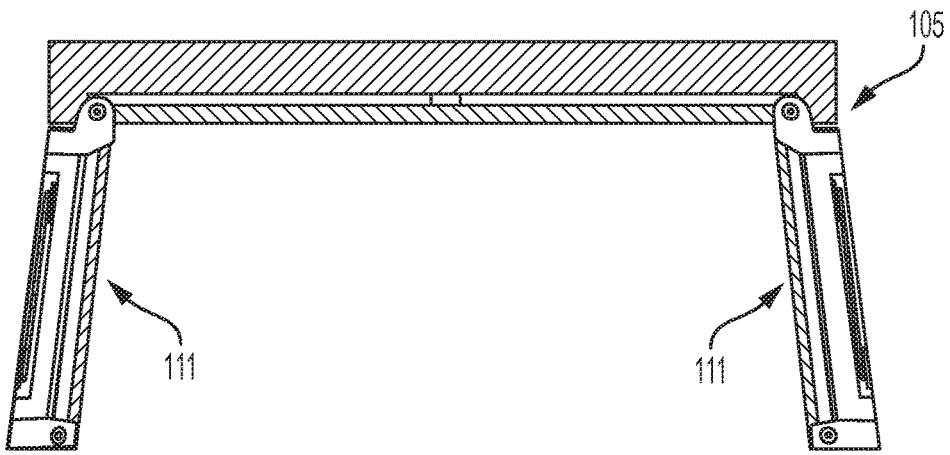

FIGS. 8-10 show cross-sectional elevation views of the deployable canopy showing the side panels 111 in various stages of deployment from FIG. 8 illustrating the stowed position, FIG. 9 illustrating the intermediate deployed configuration and FIG. 10 illustrating the fully deployed configuration.

In an embodiment (not shown), the panels 111 may pivot from upper lateral edges of the roof portion 106, transitioning through an interior of the canopy 105 to the substantially vertical deployed position. In accordance with a variation of this embodiment, the panels 111 may slide outwardly from the upper lateral edges of the roof portion 106 and then pivot downwardly to the substantially vertical deployed position.

These figures illustrate the vertical column tracks 113, 114 at inner facing sides of the respective forward column 110/cabin 101 and rear column 107. Similarly, horizontal roof portion 106 tracks 116, 117 also shown.

The panels 111 comprise bearings 124 which run along the horizontal roof portion tracks 116, 117 and the vertical column tracks 113, 114. Specifically, outer bearings 124A run vertically within column tracks 113, 114 whereas inner bearings 124B run along horizontal roof portion tracks 116, 117.

The panels 111 may further comprise locking pins 125 which extend outwardly longitudinally to lock the panels 111 in place. In embodiments, the locking pins 125 may locate coaxially with the associated bearings 124. For example, when in the deployed configuration as is illustrated in FIG. 10, the locking pins 125 may extend out to lock within corresponding apertures defined within the columns 110, 107. The locking pins 125 may also be utilised for locking the panels 111 in the stowed position shown in FIG. 8. Extra locking methods may be used.

The locking pins 125 may be automatically actuated by way of an electromechanical actuator having a position sensor to actuate the locking pins at the appropriate side panel position.

In embodiments, where the panels 111 are electromagnetically actuated, the panels 111 may comprise an emergency override handle (not shown) to physically disengage the panels 111.

The panels 111 may comprise glass windows 127 located centrally therein. The glass windows 127 may be hingedly coupled so as to be pivotally openable and held in an open position by gas struts 126.

The panels 11 may further comprise cargo bay edge weather seals 128 which seal against the upper edge 108 of the cargo bay 103. Furthermore, the panels may comprise column weather seals 129 which seal against the respective column 107, 110.

Figure 11:
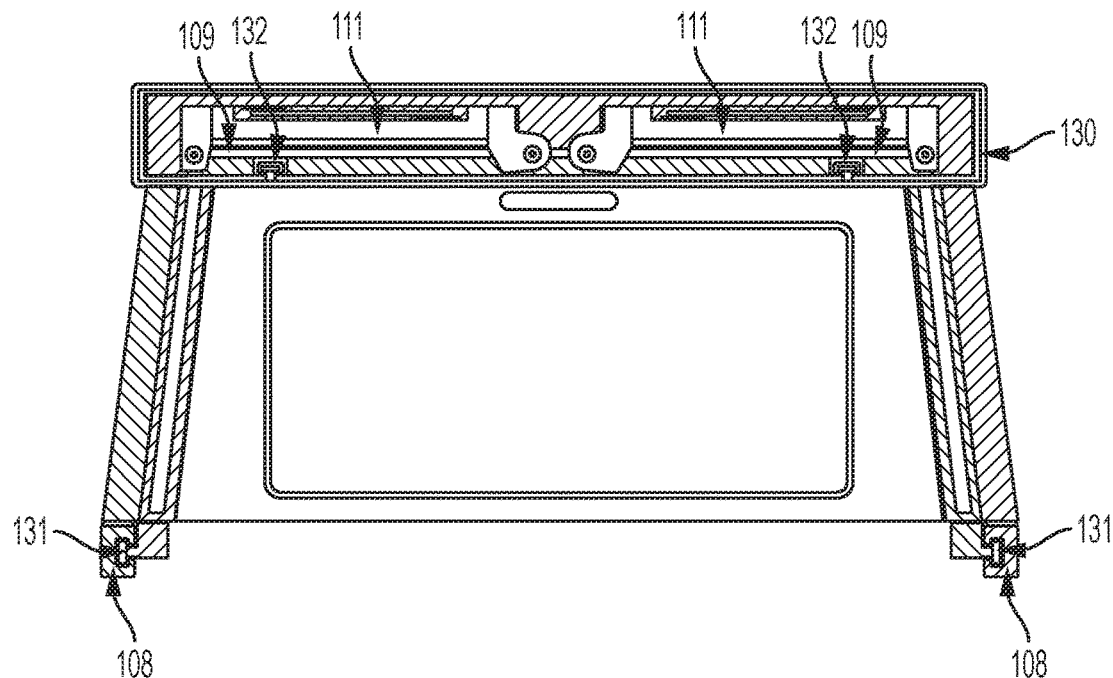
FIG. 11 illustrates a rear elevation view of the deployable canopy in accordance with an embodiment.

Whereas the aforedescribed embodiments show the roof portion 106 deploying from tracks 109 atop the cabin, FIG. 11 illustrates an embodiment comprising a housing sleeve 130 which is attached to the cabin roof and from which the roof portion 106 slides rearwardly.

FIG. 11 also illustrates the cargo bay edge tracks 108 being inwardly facing, according to one embodiment, comprising bearings 131 of the rearward columns 107 extending laterally therein for running there along. The bearings 131 may key into the channels as shown to prevent pulling therefrom. Furthermore, there is shown the cabin tracks 109 engaged by corresponding channels 132 beneath the roof portion 106 which may be similarly keyed. FIG. 11 also illustrates the side edges of the canopy 105 angling towards the roof portion 106 by approximately 80°.

Figure 12:
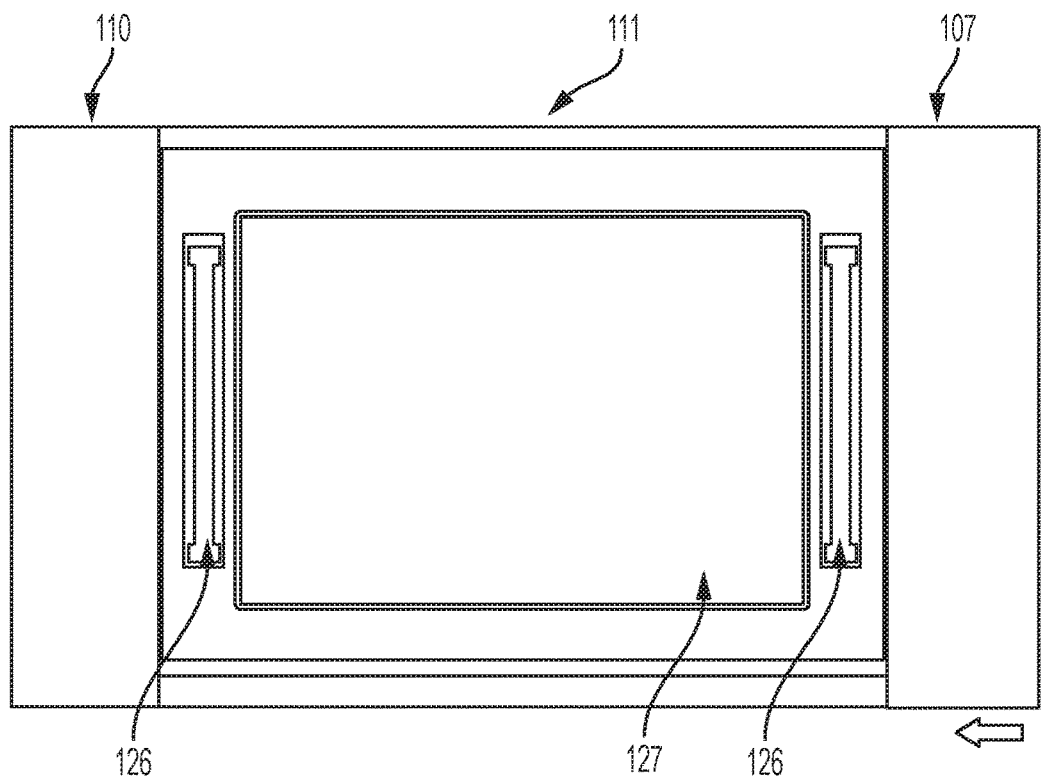
FIG. 12 illustrates a side elevation view of the side panel of the deployable canopy in accordance with an embodiment.

FIG. 12 illustrates a side view of the panel 111 between the columns 107, 110 comprising the glass window 127 held open by the gas struts 126.

Figure 13:
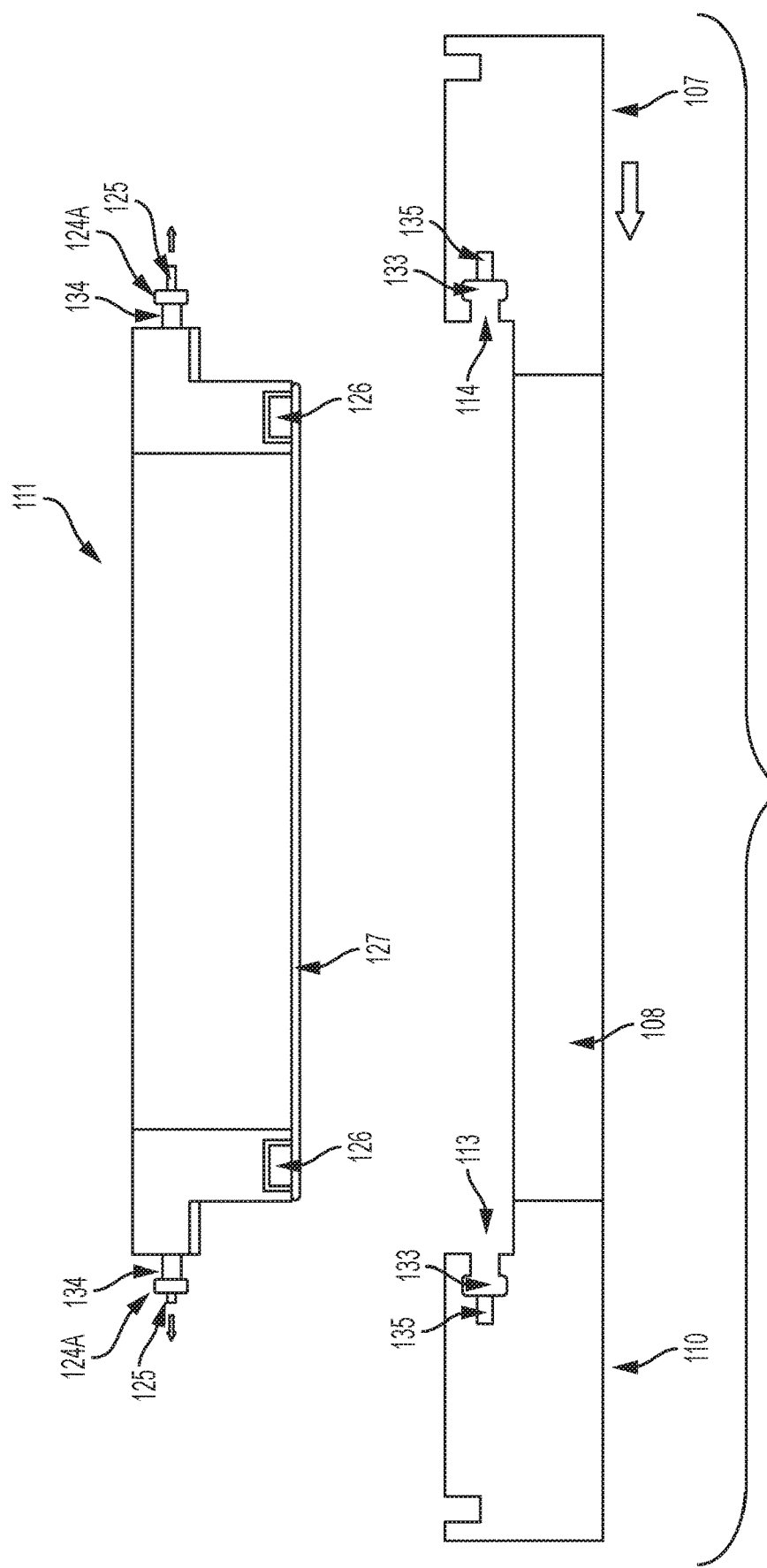
FIG. 13 illustrates a top plan view of the side panel of the deployable canopy in accordance with an embodiment.

FIG. 13 illustrates a top view of the panel 111 between the forward column 110 and the rearward column 107, the rearward column 107 sliding along the cargo bay upper edge track 108. There is illustrated the panel 111 comprising the glass window 127 held open by gas struts 126.

There is also shown the forward vertical column track 113 and the rearward vertical column track 114 each comprising a wider vertically running channel 133 within which vertically running bearings 124A are engaged and held therein by stems 134 extending through a narrowed entrance for keying.

There is also shown the selectively deployable locking pins 125 which may locate coaxially with the bearings 124A in selectively extend into locking pin apertures 135 within the columns 107, 110.

In embodiments, a waterproofing panel may be provided between the forward columns 110 to weatherproof the cargo bay.

Figure 14:
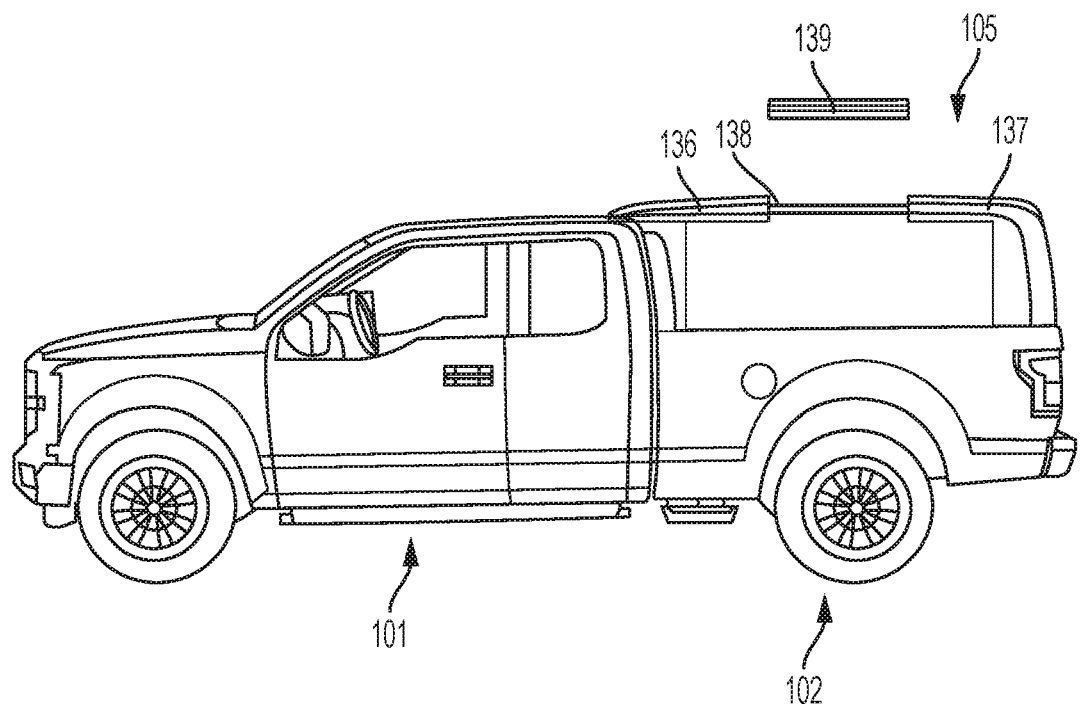
FIGS. 14 and 15 illustrates a bifurcated arrangement of the deployable canopy for utility vehicles comprising a cargo bay longer than the roof of the cabin in accordance with an embodiment.
Figure 15:
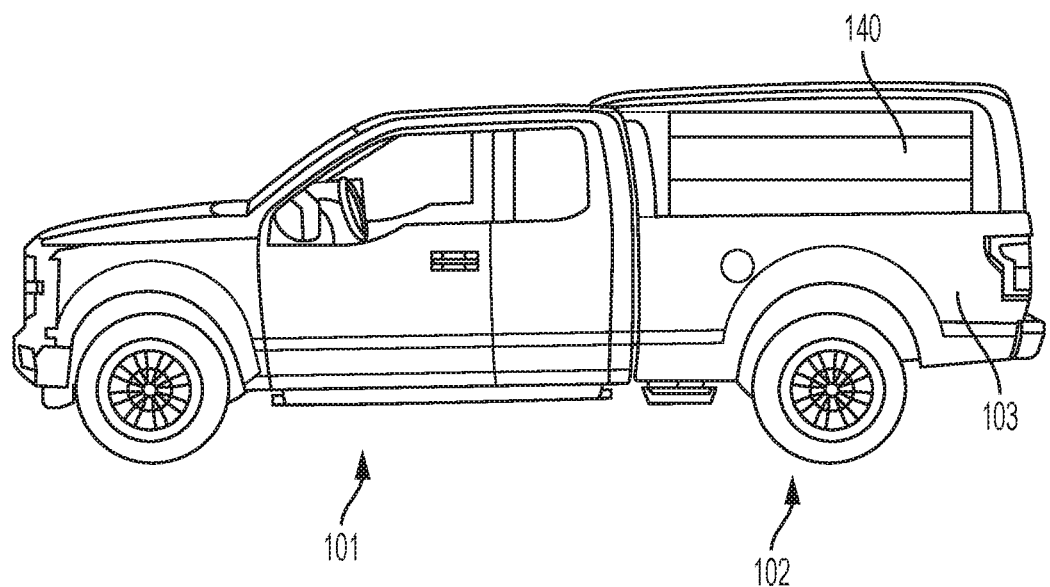

FIGS. 14 and 15 show an embodiment wherein the cargo bay is longer than the roof area of the cab. In accordance with this embodiment, the deployable canopy 105 is bifurcated comprising a forward portion 136 and a rearward portion 137 spaced by struts 138 therebetween when fully deployed. When stowed, the portions 136, 137 may locate adjacently or overlap atop the cabin roof.

During deployed, both portions 136, 137 may move rearwardly until such time that the forward portion 136 reaches its travel limit extent whereafter rearward portion 137 continues rearwardly along struts 138 to the travel limit extend shown in FIG. 14. A removeable joining roof portion 139 may locate atop struts 138 to complete the canopy between the forward and rearward portions 136, 137. Thereafter, as is shown in FIG. 15, side panels 140 may deploy upwardly from the side walls 103 of the cargo bay 102. In embodiments, the side panels 140 may be roller type side panels so as to not intrude into the wheel arch of the cargo bay 102.

Figure 16:
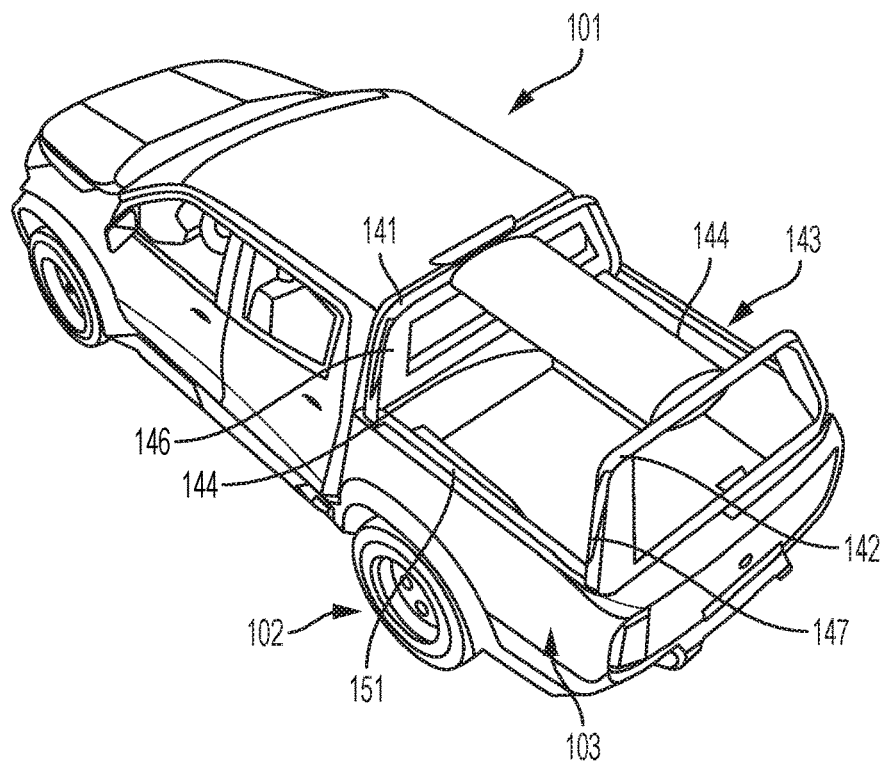
FIG. 16 shows a top perspective views of a utility vehicle comprising forward and rearward builder bars and a removable cassette locating longitudinally therebetween in accordance with a further embodiment.

FIG. 16 illustrates a utility vehicle comprising forward and rearward builder bars.

Figure 17:
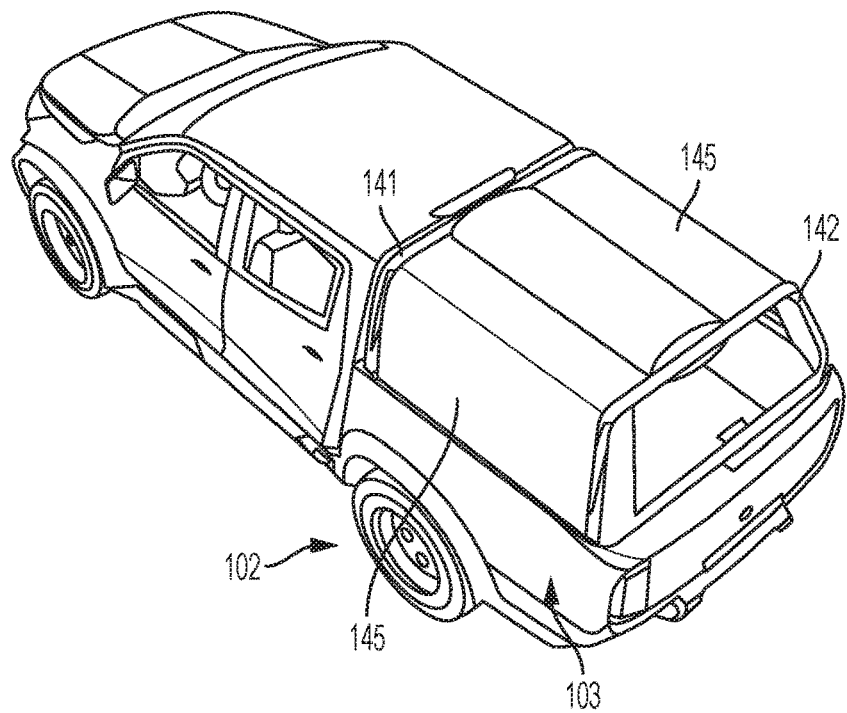
FIG. 17 illustrates the deployment of side covers from the removable cassette in accordance with an embodiment.

There is illustrated a removable cassette 143 that engages longitudinally between the forward and rearward builder bars 141, 142. The cassette 143 comprises lateral lengthwise openings from which a deployable cover 145 may unroll between forward and rearward tracks 147 in the manner illustrated in FIG. 17 so as to selectively enclose the area of the cargo bay 102.

Figure 18:
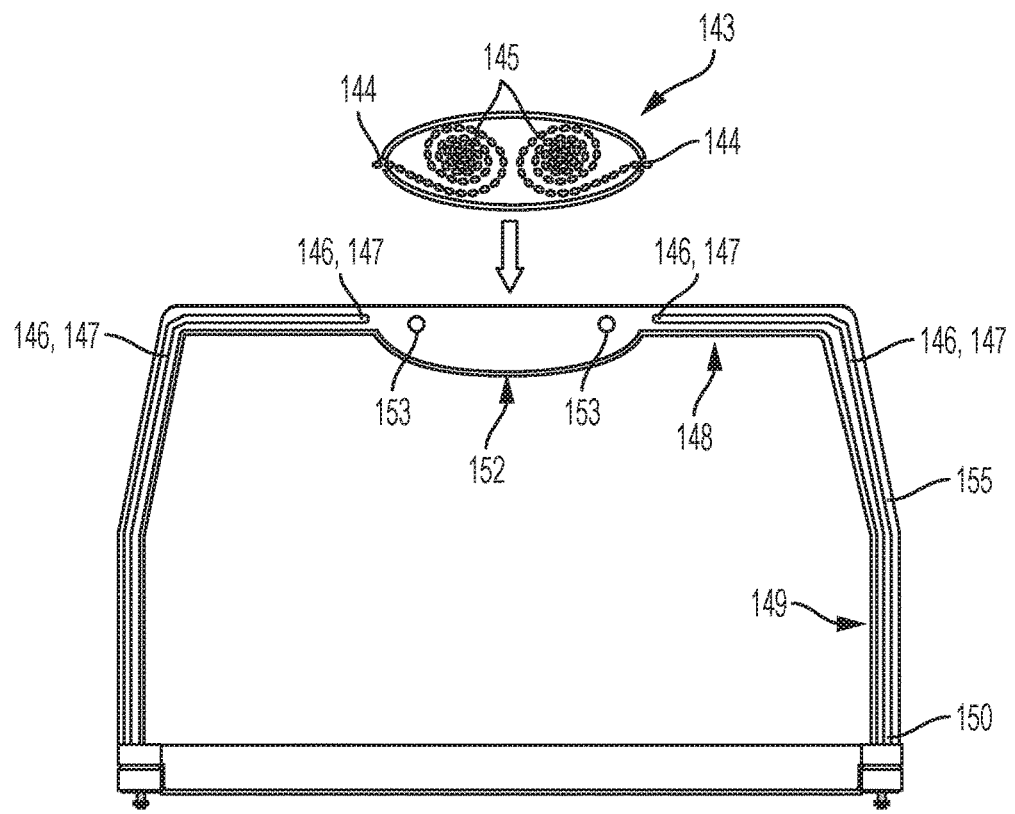
FIGS. 18-19 show a rear elevation view of the removable cassette.
Figure 19:
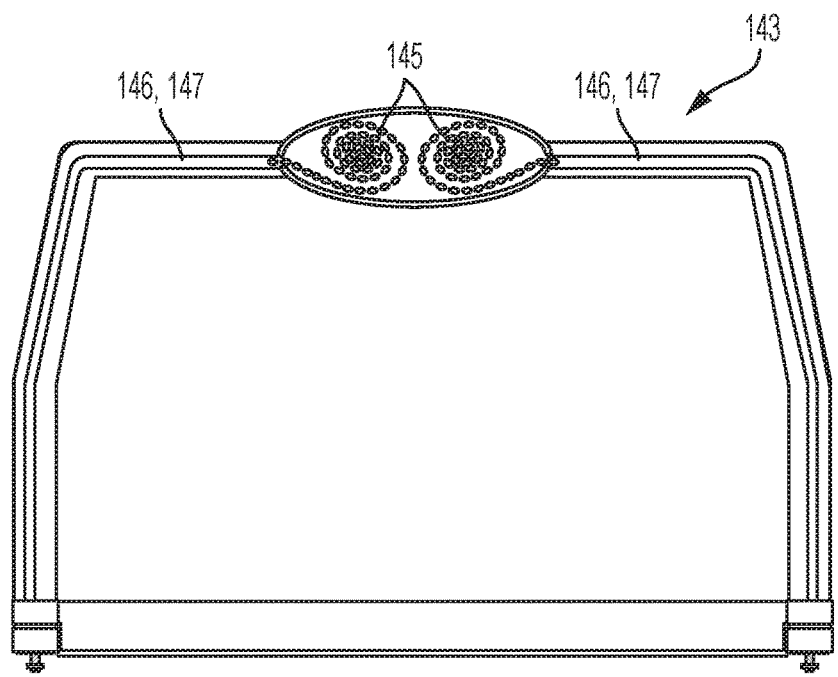

FIG. 18 illustrates a rear elevation view showing the cassette 143 and the deployable covers 145 rolled therein. The covers 145 extend from the lateral openings 144 into the beginning of the tracks 147 which transitions from a horizontal portion 148 to a vertical portion 149 to meet the upper edge 150 of the cargo bay sidewall 103. In the embodiment shown, a seal or gasket 151 may locate atop the upper edge of the side all 103 to seal against the respective distal edges of the covers 144.

The covers 144 may comprise a flexible construction of fabric (such as canvas) longitudinally strengthened by way of batons. Alternatively, the covers 144 may be metallic comprising a plurality of interlocking longitudinal metallic extrusions.

In embodiments, the covers 145 may retract under coil spring action. Alternatively, the rolling and unrolling of the covers 145 may be motorised.

FIG. 18 illustrates the lower portion of the tracks 146, 147 continuing underneath the cassette 143 to define a seat 152 for holding upper the cassette 143. Furthermore, inner facing apertures 153 may be formed within the builder bars 141, 142 for the selective engagement of longitudinally extending locking pins 154 shown in FIG. 21.

Figure 20:
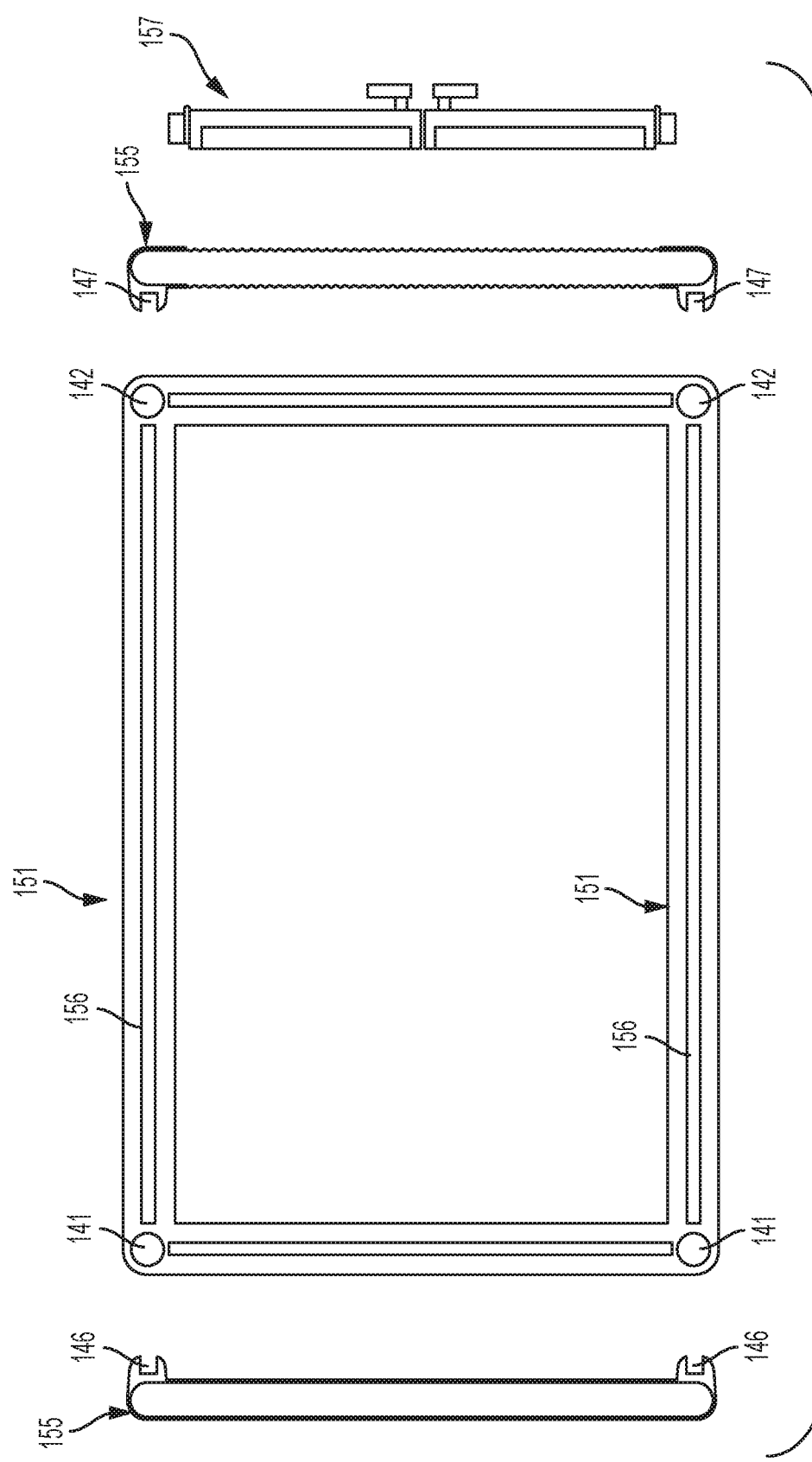
FIG. 20 illustrates a top plan view of an arrangement of the builder bars comprising sleeves for engaging thereto for defining the forward and rearward facing tracks in an embodiment.

FIG. 20 illustrates a top plan view of the arrangement of builder bars 141, 142. The opposing cover tracks 146, 147 may be provided by way of sleeves 155 which locate around the builder bars 141, 142 or 146, 147 may be directly attached to the builders bars. There is also shown the seal/gasket 151 defining a gutter 156 therein for engaging the edges of the covers 145 therein. The arrangement may further comprise rear double doors 157 which may locate within the rear builder bars 147. The rear double doors 157 or the like may locate within a framework that may frictionally engage the inner edges of the rear builder bar 142. Alternatively, the framework may comprise a locking pin arrangement comprising extendable locking pins that lock within corresponding apertures of the rear builder bars 142.

Figure 21:
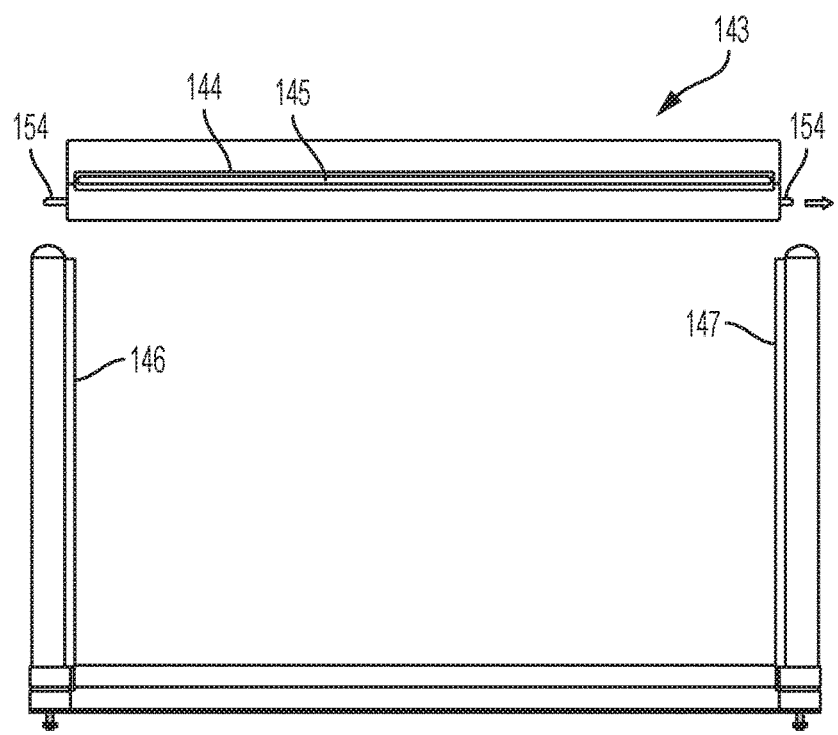
FIG. 21 illustrates a side elevation view of the removable cassette and the couplings of the removable cassette for engagement between the builder bars in accordance with an embodiment.

FIG. 21 illustrates a side elevation view of the cassette 143 illustrating the longitudinal openings 144 from which the covers 145 feed. Furthermore, the corresponding forward and rearward locking pins 154 are shown.

Figure 22:
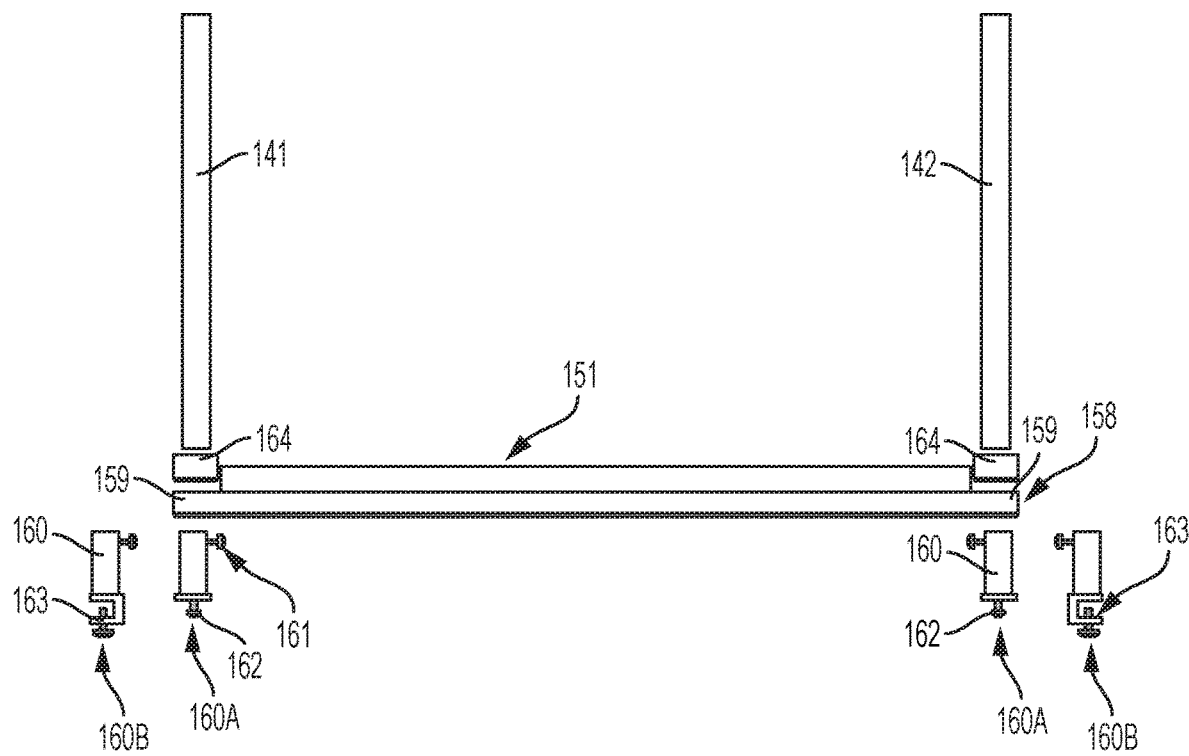
FIG. 22 illustrates a modular construction of the builder bars and lateral seals/gaskets in accordance with an embodiment.

FIG. 22 illustrates an embodiment wherein the side seals/gaskets 151 may be provided by way of a modular piece 158 comprising end collets 159 which locate atop cylindrical sections 160 and which may be locked thereto by way of locking pins 161. The cylindrical sections 160 may comprise a cylindrical section 160A comprising an inferior bolt 162 which secured through a corresponding aperture of the edge of the cargo bay 102. Furthermore, the cylindrical sections 160 may comprise a clamping cylindrical section 160B comprising a clamp 163 which clamps around an edge of the cargo bay.

The cylindrical sections 160 may mate with the builder bars and have coaxial spacers.

Figure 23:
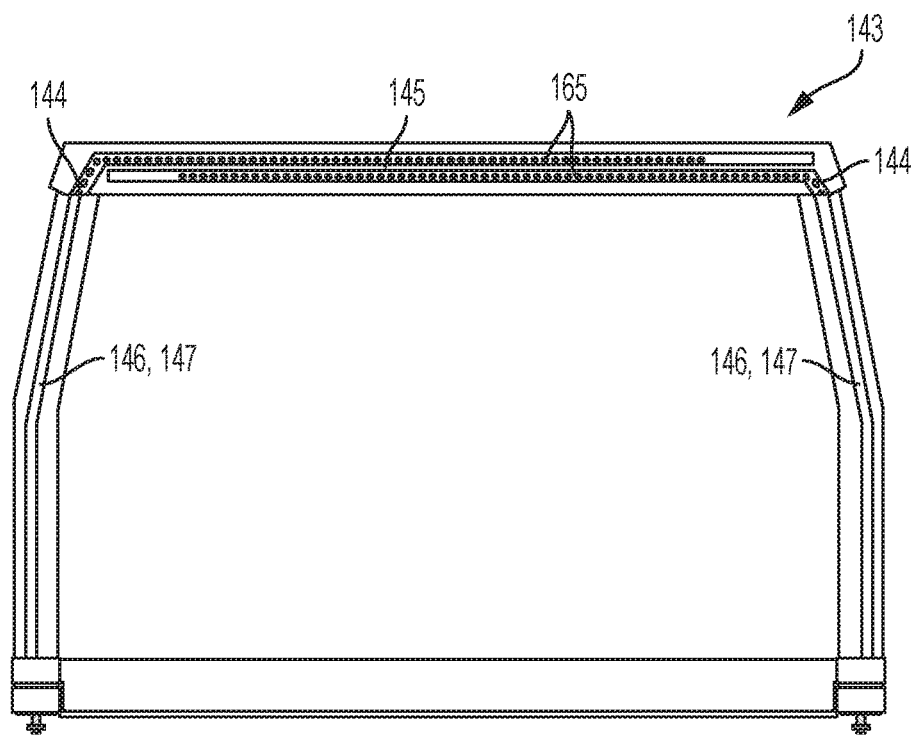
FIGS. 23 and 24 illustrate respective rear and side elevation views of the removable cassette being flat and comprising a pair of coplanar overlapping straight channels therein in accordance with an embodiment.

FIG. 23 illustrates a rear elevation view of an embodiment wherein the removable cassette 143 is flat and wherein the covers 145, 145 are located within coplanar straight channels 165. The opposite respective edge openings 144 lead in to the respective tracks 146, 147.

The straight channels 165 may be overlapping in the manner shown where the side covers 145 are required to be longer than the roof width, such as for flatbed utility vehicles.

Figure 24:
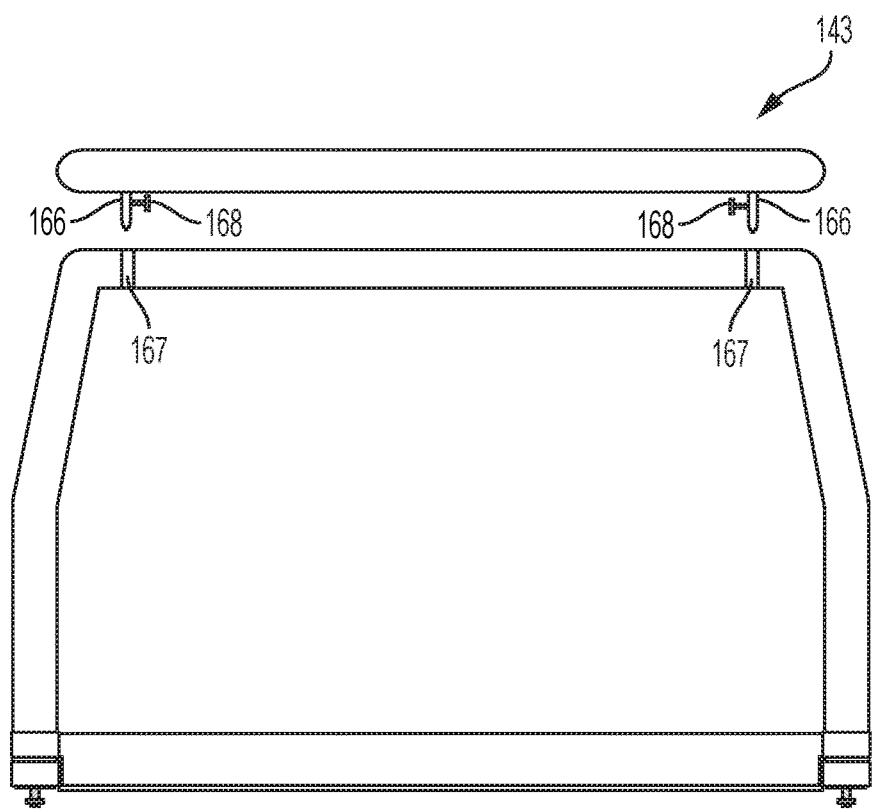

FIG. 24 illustrates a side elevation view of the flat removable cassette 143 comprising stubs 166 that selectively locate within apertures 167 and held therein by way of locking pins 168.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A deployable canopy system for a utility vehicle having a cabin and a cargo bay, the system comprising a deployable canopy, the canopy comprising a roof portion and rearward travelling columns wherein a front of the canopy engages roof mounted cabin tracks and wherein distal ends of the rearward columns engage cargo bay edge tracks of the cargo bay such that the deployable canopy is able to slide longitudinally from a stowed position wherein the roof portion lies substantially atop the cabin to a deployed configuration wherein the roof portion substantially covers the cargo bay, wherein the roof portion stows side panels horizontally in the stowed position for deployment for covering sides of the cargo bay in the deployed configuration and wherein each side panel defines an inner edge and an outer edge, wherein the inner edge slides horizontally within opposing horizontal roof portion tracks and wherein the outer edge slides vertically within opposing inner facing vertical tracks between the rearward columns and the cabin such that each side panel rotates between the stowed position and the deployed configuration and wherein the inner facing vertical tracks comprise forward and rearward vertical tracks and the horizontal roof portion tracks comprise forward and rearward horizontal tracks and wherein, in the deployed configuration, the forward horizontal and vertical tracks come into alignment.

2. The deployable canopy system as claimed in claim 1, wherein the system further comprises fixed forward columns having the forward vertical tracks.

3. The deployable canopy system as claimed in claim 2, wherein the rearward columns comprise substantially orthogonal rearward and lateral portions and wherein, in the stowed configuration, the lateral portions overlap or adjoin the forward columns.

4. The deployable canopy system as claimed in claim 1, wherein the side panels comprise bearings which run within the horizontal roof portion tracks and the inner facing vertical tracks.

5. The deployable canopy system as claimed in claim 4, wherein the bearings are keyed within a widened channel within the horizontal roof portion tracks and the inner facing vertical tracks.

6. The deployable canopy system as claimed in claim 5, wherein the cargo bay edge tracks have oppositely inner facing entrances.

7. The deployable canopy system as claimed in claim 1, further comprising panel locking pins selectively locking within corresponding apertures.

8. The deployable canopy system as claimed in claim 1, wherein the side panels comprise selectively longitudinally extending locking pins selectively locking into corresponding apertures at at least one side panel position, the apertures located in alignment with the horizontal roof portion tracks and the inner facing vertical tracks.

9. The deployable canopy system as claimed in claim 8, wherein the locking pins are coaxial with bearings of the side panels.

10. The deployable canopy system as claimed in claim 1, further comprising edge seals which seal against outer edges of the side panels and the cargo bay.

11. The deployable canopy system as claimed in claim 1, further comprising lateral seals which seal against side outer facing edges of the side panels and corresponding inner facing edges of the columns.

12. The deployable canopy system as claimed in claim 1, wherein the side panels transition by way of electromechanical actuator.

13. The deployable canopy system as claimed in claim 12, wherein the side panels transition by way of screw drive electromechanical actuator having at least one laterally orientated screw rod.

14. The deployable canopy system as claimed in claim 13, wherein the screw drive electromechanical actuator acts on the inner edges of the side panels.

15. The deployable canopy system as claimed in claim 1, wherein the side panels comprise hingedly coupled windows.

16. The deployable canopy system as claimed in claim 15, further comprising gas struts holding the windows open.

17. The deployable canopy system as claimed in claim 1, further comprising an upwardly deployable tailgate window enclosing a rear of the deployable canopy in the deployed position.

* * * * *